United States Patent
Thueringer et al.

(10) Patent No.: US 9,418,249 B2
(45) Date of Patent: Aug. 16, 2016

(54) SYSTEM OF PROVIDING A FIXED IDENTIFICATION OF A TRANSPONDER WHILE KEEPING PRIVACY AND AVOIDING TRACKING

(75) Inventors: Peter Thueringer, Graz (AT); Hans De Jong, Eindhoven (NL); Bruce Murray, Hamburg (DE); Heike B. Neumann, Hamburg (DE); Paul Hubmer, Hart-Purgstall (AT); Susanne Stern, Graz (AT)

(73) Assignee: NXP B.V., Eindhoven (NL)

( * ) Notice: Subject to any disclaimer, the term of this patent is extended or adjusted under 35 U.S.C. 154(b) by 643 days.

(21) Appl. No.: 12/994,511

(22) PCT Filed: May 12, 2009

(86) PCT No.: PCT/IB2009/051952
§ 371 (c)(1),
(2), (4) Date: Dec. 31, 2010

(87) PCT Pub. No.: WO2009/147545
PCT Pub. Date: Dec. 10, 2009

(65) Prior Publication Data
US 2011/0091038 A1    Apr. 21, 2011

(30) Foreign Application Priority Data
May 26, 2008    (EP) .................................... 08104089

(51) Int. Cl.
*H04L 29/06*  (2006.01)
*G06F 21/83*  (2013.01)
(Continued)

(52) U.S. Cl.
CPC ................ *G06F 21/83* (2013.01); *G06F 21/35* (2013.01); *G06F 21/445* (2013.01); *G06F 21/6245* (2013.01); *G06F 2221/2129* (2013.01)

(58) Field of Classification Search
CPC . H04L 2209/805; G06F 21/35; G06F 21/445; G06F 21/6245; G06F 21/83; G06F 2221/2107; G06F 2221/2129
USPC .......................................................... 380/255
See application file for complete search history.

(56) References Cited

U.S. PATENT DOCUMENTS 7,337,316 B1 * 2/2008 Evans et al. .................... 713/162
7,791,451 B2    9/2010 Lei et al.
(Continued)

FOREIGN PATENT DOCUMENTS

| CN | 101165701 A | 4/2008 |
|---|---|---|
| EP | 1 589 471 A2 | 10/2005 |
| WO | 2006/134563 A1 | 12/2006 |
| WO | 2007/123895 A2 | 11/2007 |

OTHER PUBLICATIONS

International Search Report for Patent Appln. No. PCT/IB2009/051952 (Oct. 27, 2009).
(Continued)

*Primary Examiner* — Yogesh Paliwal

(57) ABSTRACT

Transponder (180) having stored a fixed identification number, which expands said identification number with a random number, encrypts said expanded number with a key, and sends it to a reader (160) on its request. Reader (160), which on request receives an encrypted number from a transponder (180), decrypts a received encrypted number with a key, which was also used by the transponder (180), and extracts a fixed identification number associated with the transponder (180).

15 Claims, 8 Drawing Sheets

(51) Int. Cl.
*G06F 21/35* (2013.01)
*G06F 21/44* (2013.01)
*G06F 21/62* (2013.01)

(56) References Cited

U.S. PATENT DOCUMENTS

| | | |
|---|---|---|
| 2002/0104890 A1* | 8/2002 | Yoshimoto et al. ............ 235/492 |
| 2004/0120518 A1* | 6/2004 | Macy et al. ..................... 380/29 |
| 2005/0058292 A1* | 3/2005 | Diorio et al. .................. 380/270 |
| 2007/0016942 A1* | 1/2007 | Sakai et al. ......................... 726/9 |
| 2007/0187502 A1* | 8/2007 | Patel et al. .................... 235/451 |
| 2009/0267747 A1* | 10/2009 | Rivest et al. ............... 340/10.51 |

OTHER PUBLICATIONS

"Identification Cards—Contactless Integrated Circuit(s) cards—Proximity cards—Part 3: Initialization and anticollision" ISO/IEC 2000, 55 pgs (Jul. 13, 2000).

Finkenzeller, K. "RFID Handbook—Fundamentals and Applications in Contactless Smart Cards and Identification", Second Edition, John Wily & Sons Ltd, 2003, pp. 176, 205-219, 274.

Official Communication from counterpart foreign application No. 09757897.5 (Jul. 30, 2014).

* cited by examiner

| Blocksize bytes | Blockcipher passes | Diversity bytes | 7-byte UID | Manuf ID loc'n | Proprietary CMD resp (bytes) | Attack Resources Faciliated tracking |
|---|---|---|---|---|---|---|
| 8 | 1 | 3 | N | either | 5 or 6 | 80MB / 50 ms |
| 10 | 2 Feistel | 3 | Y | ciphertext | 7 | 112MB / 50 ms |
| | | 4 | Y | explicit | 7 + manuf ID | 28GB / 50 ms |
| 12 | 2 Feistel | 5 | Y | ciphertext | 9 | 9TB / 50 ms |
| | | 6 | Y | explicit | 9 + manuf ID | 9MB / 15 hrs |
| 14 | 2 Feistel | 7 | Y | ciphertext | 11 | 144MB / 10 days |
| | | 8 | Y | explicit | 11 + manuf ID | 3GB / 5 months |
| 16 | 2 Feistel | 9 | Y | ciphertext | 13 | 48GB / 7 years |
| | | 10 | Y | explicit | 13 + manuf ID | 832GB / 109 years |
| | | | | | | 14TB / 1700 years |

Fig. 7

SYSTEM OF PROVIDING A FIXED IDENTIFICATION OF A TRANSPONDER WHILE KEEPING PRIVACY AND AVOIDING TRACKING

FIELD OF THE INVENTION

This application claims the benefit of the filing date of European Patent Application No. 08104089.1 filed 26 May 2008, the disclosure of which is hereby incorporated herein by reference.

The invention relates to a transponder having stored a fixed identification number, a reader, which on request receives an encrypted number from a transponder, a method of transmitting a fixed identification number to a reader, a method of receiving an encrypted number from a transponder. Beyond this, the invention relates to a program element. Furthermore, the invention relates to a computer-readable medium. Moreover, the invention relates to a communication system.

BACKGROUND OP THE INVENTION

Smart cards may have stored a unique identification number (UID), with which they can be unambiguously identified. A reader can—in particular if there are a number of smart cards within the radio range of the reader select a certain smart card and communicate to this selected smart card. This identification can be fixed so that the card is always unambiguously identified. Alternatively, this identification can be random so that the card can be tmambiguously identified during a session (a session takes as long until the card leaves the radio range of the reader again).

A random identification may be chosen if the privacy and/or traceability of its owner shall be guaranteed because a fixed identification can unambiguously be associated with an individual, whose location then can easily be determined and tracked as well. In most eases this is undesired for card owners.

OBJECT AND SUMMARY OF THE INVENTION

Hence, it is an object of the invention to provide a reader and/or a transponder being operable in a safe manner.

The object of the invention is achieved by a transponder, a reader, a communication system, methods, a program element and a computer-readable medium according to the independent claims.

According to an exemplary embodiment, a transponder (which may be communicatively coupled with a reader) is provided, the transponder having stored a fixed identification number (such as a unique identifier which may be not changeable during different sessions, wherein a session may take as long until the transponder leaves a radio range of the reader again), which transponder expands said identification number with a random number (for instance a true random number or a pseudo random number which may be generated by a random number generator of the transponder or which may be stored in a storage unit of the transponder), encrypts said expanded number with a key (which key may also be known by the reader), and sends it to a reader on its request (for instance by a communication message transmitted from the reader to the transponder).

According to another exemplary embodiment, a reader is provided (which may be communicatively coupled with a transponder), which on request (for instance by a communication message transmitted from the reader to the transponder) receives an encrypted number from a transponder, decrypts a received encrypted number with a key, which was also used by the transponder, and extracts a fixed identification number associated with the transponder (for instance unambiguously identifying the transponder).

According to still another exemplary embodiment, a communication system is provided, the communication system comprising a transponder having the above-mentioned features and a reader having the above-mentioned features communicatively coupled with the transponder.

According to still another exemplary embodiment, a method (which may be executed by a transponder) of transmitting a fixed identification number to a reader is provided, the method comprising:

expanding said fixed identification number with a random number, encrypting said expanded number with a key, and sending the encrypted expanded number to a reader on its request.

According to yet another exemplary embodiment, a method (which may be executed by a reader) of receiving a fixed identification number from a transponder is provided, the method comprising:

receiving an encrypted number on request, decrypting said expanded number with a key, which was also used by the transponder, and extracting said fixed identification number associated with said transponder.

According to still another exemplary embodiment of the invention, a program element (for instance a software routine, in source code or in executable code) is provided, which, when being executed by a processor, is adapted to control or carry out a method having the above mentioned features.

According to yet another exemplary embodiment of the invention, a computer-readable medium (for instance a semiconductor memory, a CD, a DVD, a USB stick, a floppy disk or a harddisk) is provided, in which a computer program is stored which, when being executed by a processor, is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

The term "transponder" may particularly denote an RFID tag or a (for instance contactless) smartcard. More generally, a transponder may be a device (for instance comprising a chip) which may automatically transmit certain (for example coded) data when activated by a special signal from an interrogator.

The term "reader" may particularly denote a base station adapted for sending an electromagnetic radiation beam for reading out a transponder and detecting a back reflected or emitted signal. The reader device may be adapted as one of the group consisting of a read and/or write device, an RFID reader, a contactless chip card reader, a passive transponder, and a Near Field Communication device.

One or more "applications" may be provided by a communication system formed by the transponder and the reader. Such an application may particularly denote a service within the communication system formed by the reader and the transponder to which service the transponder and/or the reader may provide a contribution. The provision of such a contribution may involve the capability of the transponder to provide stored or calculated data, to provide processing capabilities, etc. Examples for such services is the payment of a fare for using a public transportation by a user of the transponder, the payment of a purchase price for goods or services by a wireless payment system, etc.

The term "expanding" a first data item with a second data item may particularly denote adding the second data item to the first data item. Such an expanding may include various alternatives such as starting with the first data item and attaching the second data item to an end of the first data item, starting with the second data item and attaching the first data item to an end of the second data item, splitting at least one of the first and the second data item into two of more sections and interleaving sections of one of the first and the second data item between sections of the other one of the first and the second data item. Any other more complex algorithm or rule of mixing the first and the second data items may be considered as an expansion as well. Such an algorithm or rule may be agreed between transponder and reader device.

An embodiment of the invention offers the advantage that a transponder can send its fixed identification number to a reader without compromising privacy, that is by rendering the association of a transponder with an individual and the traceability of said transponder impossible. This may be made possible by adding a random number to the fixed identifier before encrypting the resulting data block with a key which may be agreed upon with the reader. By taking this measure, the uniqueness of the fixed identification number is maintained and at the same time it is made very difficult for an attacker to trace the transponder since the random number may be changed for each communication session.

Hence, an embodiment of the invention provides a fixed identification of a smart card to a reader, but also ensures that privacy is kept and traceability is avoided.

In the following, further exemplary embodiments of the transponder will be explained. However, these embodiments also apply to the reader, to the methods, to the program element and to the computer-readable medium.

In an embodiment, the transponder may comprise a transmission unit (such as an antenna) which may be adapted to send at least a part of the encrypted number to the reader during an anticollision procedure. Thus, at the beginning of a communication between a transponder and a reader, a procedure may be executed which allows the reader to select one of the transponders within the communication range of the reader for subsequent communication. During such an anticollision procedure, the reader may ask the transponders to transmit their identifiers so that the reader can select one of the transponders on the basis of the respective identifier. During such an anticollision procedure, it is appropriate to protect the communication system against safety attacks by an attacker evaluating wireless communication messages exchanged between transponder and reader. For instance, only three bytes of the encrypted number may be sent during the anticollision process, the remainder may be sent later. Hence, there is a possibility that only part of the encrypted number is communicated during anticollision.

A processing unit (such as an integrated circuit of the transponder having processing capabilities) of the transponder may be adapted to expand the identification number with a random number and to encrypt said expanded number with a key during a first session (a session may take as long until the transponder leaves the radio range of the reader again) of communicating with the reader. This expansion and encryption may be performed for use of the encrypted expanded number during a second (later) session of communicating between the transponder and the reader which second session succeeds the first session. In such an embodiment, a fast communication may be enabled in a scenario in which the transponder and the reader first communicate during a first session, for instance during a first time interval in which the transponder is in the communication range of the reader. When the transponder leaves this communication range, the first session may be terminated. When the transponder, at a later time, moves back into the communication range, a new random number may be used for the sake of safety and in order to prevent trackability by an attacker. The generation of such a random number and the encryption of the fixed identification number with this new random number requires time and processing capabilities. According to the described embodiment, such a processing may be performed in advance, that is already in the preceding session, so that communication in the succeeding session may be much faster.

The random number may be a pseudo random number. In contrast to a pseudo random number, a truly random number is a number produced independently of any generating criteria. For cryptographic purposes, numbers based on physical measurements may be considered as random. Pseudo random numbers may be numbers with as little detectable pattern as possible but not truly random. Computer programs may make pseudo random numbers because they cannot make truly random numbers. The random number generator may be part of the transponder.

The fixed identification number may be unchangeable. In other words, the unique identification number may remain fixed for all communication sessions during the lifetime of the transponder. Hence, provisions may be taken in the transponder preventing the identification number from being modified. Due to the encryption architecture of exemplary embodiments extending such a fixed identification number by a changeable random number before encrypting the combined data packet allows to combine the simple architecture of a fixed identification number system with a high degree of safety obtained by obscuring the identifier with the modifiable random number.

For example, the fixed identification number may have a length of 5 Bytes, and the random number may have a length of 3 Bytes. This allows for a high degree of safety, since a sufficiently large number of individual identifiers is possible which can be obscured with a sufficiently long random number. Such a system is difficult to attack due to the high number of trials needed during a trial and error procedure of an attacker. The combination of a random number having a length of 3 Bytes with an identifier having a length of 5 Bytes makes the number of combinations large so that any reasonable attack is almost impossible. On the other hand, a total length of 8 Bytes is still reasonable from the point of view of processing capabilities, processing times and memory capacities needed.

The transponder (as well as the reader) may be adapted to operate in accordance with ISO 14443. ISO/IEC 14443 defines a proximity card used for identification that may use a standard credit card form factor. However, other form factors are also possible. Within this standard, a radio frequency identification (RFID) reader may use an embedded microcontroller (including its own microprocessor and several types of memory) and a magnetic loop antenna that operates at 13.56 MHz (RFID frequency). Since the general architecture of a transponder according to an exemplary embodiment is in accordance with ISO 14443, it may be sufficient that only the identifier expansion and encryption procedure, using the random number, is modified. This may allow the transponder of an embodiment to be implemented in a communication system operating in accordance with the ISO 14443 standard.

In the following, further exemplary embodiments of the reader will be explained. However, these embodiments also apply to the transponder, to the methods, to the program element and to the computer-readable medium.

The reader may comprise a request unit (which may be part of a processor of the reader) adapted to request the transponder to transmit the complete encrypted number in a single communication message. In such an embodiment, the traffic over a communication channel may be kept small and the time needed for the communication may be kept short, since the entire encrypted number can be sent from the transponder to the reader included within one common communication message.

In an alternative embodiment, a request unit (which may be part of a processor of the reader) may be adapted to request the transponder to transmit the encrypted number in two separate communication messages in conformity with ISO 14443. In such an embodiment, the encrypted data item comprising the random number and the fixed identification number may be split into two separate communication messages. Such a procedure is in accordance with ISO 14443. In order to obtain compatibility of the reader/transponder system according to an exemplary embodiment with this standard, it may be possible to improve the degree of safety of a corresponding communication system.

In one embodiment, the expanded number to be encrypted may start with the random number which may be followed by the unique identifier. In another embodiment, the number to be encrypted starts with the unique identifier and is followed by the random number. In still another embodiment, the unique identifier may be arranged between different parts of the unique identifier. In still another embodiment, the random number may be arranged between different portions of the unique identifier. In each of these embodiments, it may be possible that both the transponder and the reader know the way the identification number is arranged relative to the random number.

Any one of the random number, the identification number, and the key may be any sequence of numeric characters, sequence of letters, or any alphanumeric code.

Embodiments of the invention are related to transponders, in particular smart cards and RFID tags, which provide a fixed identification number and a random extension thereof. For the sake of clarity, this description makes reference primarily to smart cards, although for one skilled in the art it is clear that embodiments of the invention equally relate to RFID tags and transponders in general.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting examples, with reference to the embodiments shown in the drawings.

FIG. 7 shows a privacy options summary according to an exemplary embodiment of the invention.

DESCRIPTION OF EMBODIMENTS

Figure 1:
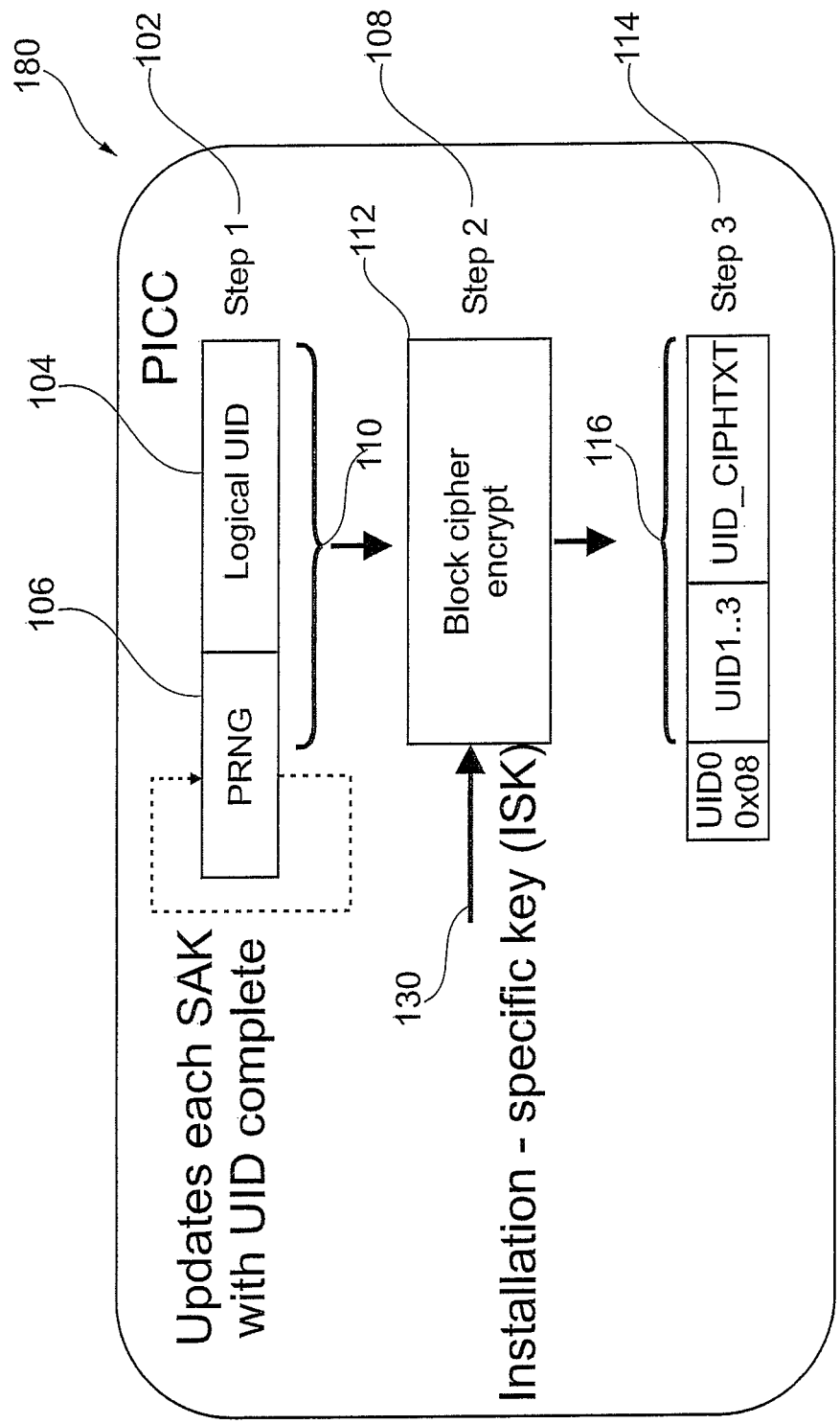
FIG. 1 shows a smart card according to an exemplary embodiment of the invention.

The illustration in the drawing is schematically. In different drawings, similar or identical elements are provided with the same reference signs.

Figure 2:
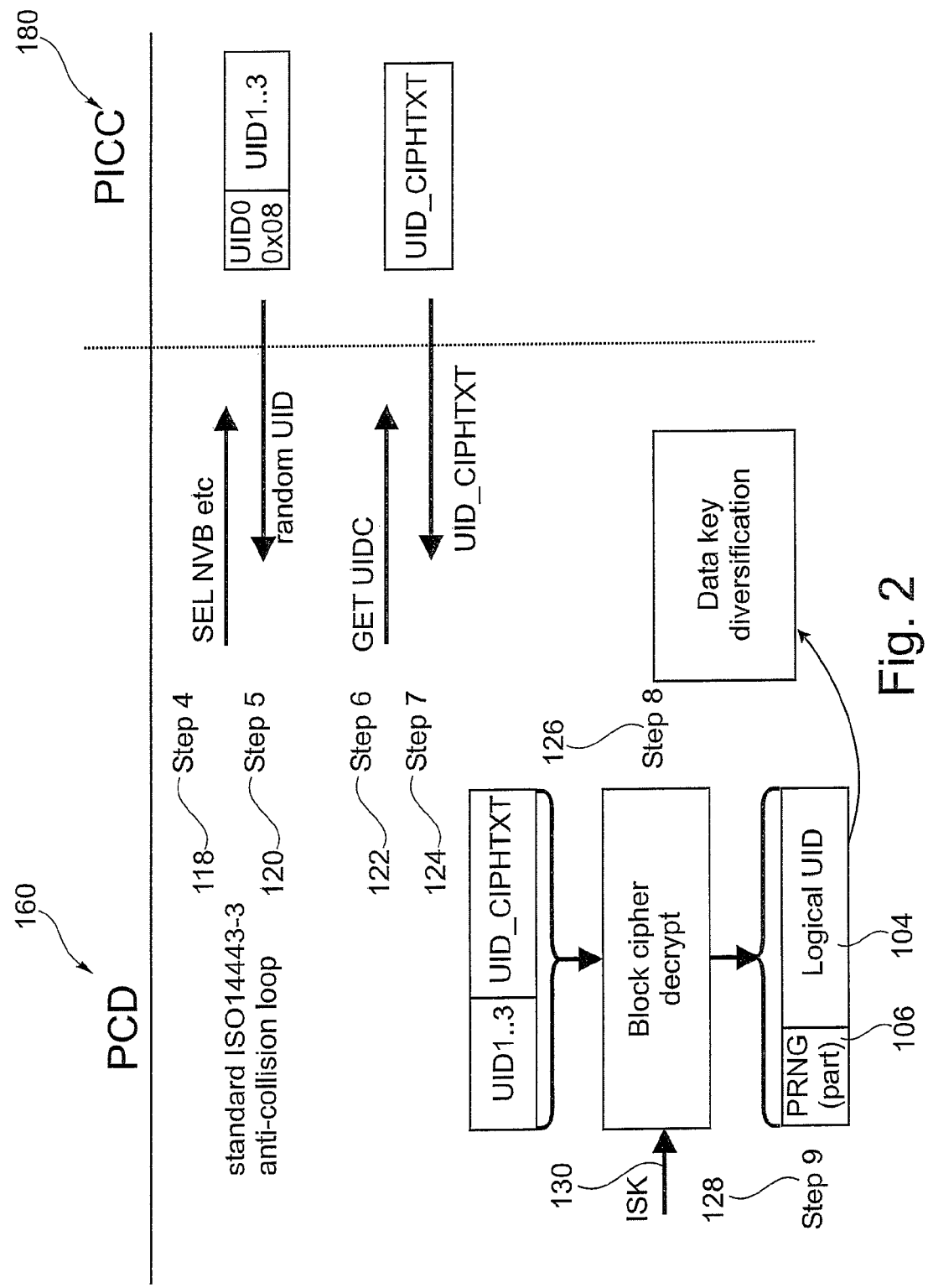
FIG. 2 shows a messageflow for a smart card and a reader according to an exemplary embodiment of the invention.

In the following description, particularly the following abbreviations will be used:
PICC Proximity Card (Smart Card)
UID Unique Identifier
PCD Proximity Coupling Device (Reader)
SAK Select AcKnowledge,
NVB Number of Valid Bits
SEL SELect code Based on a smart card PICC 180 as shown in FIG. 1 and a messageflow for the smart card PICC 180 and a reader PCD 160 as shown in FIG. 2, an exemplary embodiment of the invention is explained hereinafter:

Now referring to FIG. 1, in a step 1 (compare reference numeral 102), a fixed identification LOGICAL ID 104 is expanded by a random number 106, in particular one derived from the output of a pseudo random number generator PRNG.

In a step 2 (compare reference numeral 108), an expanded number 110 obtained as a result of step 1 is encrypted (compare reference numeral 112) with an installation-specific key ISK 130. If the random number PRNG 106 would be omitted, an encrypted number obtained as a result of step 2 would always be the same so that association of a card PICC 180 and traceability of its owner were possible. Due to the expansion of the fixed identification LOGICAL ID 104 with the random number 106 traceability of the owner may be made difficult or almost impossible.

In a step 3 (compare reference numeral 114), encrypted number 116 is stored on the smart card 180 for later use. Advantageously but not necessarily, in each session a new random number is generated so that it is available for the next session. In this way reading of the identification number of a smart card may be time optimized. Otherwise, generating the random number and the encryption would compromise a fast reading.

Now referring to FIG. 2, in a step 4 (compare reference numeral 118), the reader PCD 160 sends a select command SEL to the smart card PICC 180 during or after an anti-collision procedure.

In a step 5 (compare reference numeral 120), the smart card PICC 180 responds to the reader 160 with a random UID, in the present example with the first four bytes UID0-UID3 (in accordance with the standard ISO 14443). The first byte UID0 indicates the significance of the other three bytes UID1-UID3 (the first byte being 0x08 indicates that the remaining bytes are a "random ID"). If the first byte UID0 is set to "0x08", then the other three bytes UID1-UID3 contain a random number.

In a step 6 (compare reference numeral 122), an additional command to obtain the remaining bytes of the encrypted number (that is everything except the first three bytes) is requested by the reader 160.

In an alternative advantageous embodiment, the reader 160 can request the whole encrypted number with a single command. However, to keep conformity with ISO 14443, two separate commands are used for the present example.

In a step 7 (compare reference numeral 124), the smart card PICC 180 sends the remaining bytes to the reader PCD 160.

In a step 8 (compare reference numeral 126), the reader PCD 160 decrypts the received encrypted number with the same key ISK 130, which was used by the smart card PICC 180 in step 2.

In a step 9 (compare reference numeral 128), the fixed identification number 104 of the smart card PICC 180 is extracted.

The described procedure may involve the following advantages:

The fixed identification 104 of the smart card 180 is never transmitted in plaintext, but combined with a random number 106 and in an encrypted way.

The random number 106 may be chosen different for each session. To keep the processing capability small, the random number may alternatively be maintained constant for several sessions (for instance for a predefined number of 2 or 10 sessions), may be changed thereafter for the next several sessions, and so on.

Accordingly, a smart card cannot be associated with an individual and the smart card respectively its owner cannot be located.

In the following, some further considerations will be mentioned:

The solution according to an exemplary embodiment is fully ISO14443-3 compatible. The smart card presents an SAK byte which is coded as "UID complete, PICC not compliant with 14443-4" similar to a Mifare behavior. Then, a new command may retrieve remainder of an UID cipher text.

The random UID sequence according to an exemplary embodiment may be card-dependent.

A PRNG sequence generator need not be known by an operator/reader, so that the sequence generator design can be confined to cards.

A PRNG sequence length can be longer than portion included in block cipher. Then, even the operator cannot predict a random UID sequence for any card.

"Tracking" by an attacker would require collusion between smart card provider and operator as the knowledge of the PRNG design does not allow a smart card provider to predict a random UID sequence. A smart card provider would also need knowledge of the key ISK.

PICC can "type identify" itself as capable of returning a fixed logical UID. A specific proprietary coding value can be used in SAK therefore.

Block size of standard block cipher (for instance 3DES) is only 8 bytes. Inclusion of 3 bytes (part) of PRNG in plaintext space to match diversity of the random physical UID will leave 5 bytes of usable logical UID space corresponding to about 1 trillion devices.

If a return to a full 7-byte logical UID as defined in ISO14443 is needed, 10-byte block size can be implemented as well (256 trillion devices including UID0-manufacturer ID).

An invertible transformation over non-standard block size using standard block cipher and Feistel structure can be made (at top level).

In case of for instance 72 bits of PRNG in plaintext space, supplied table size of 236 (13×236 bytes=832 GB) and 236 card accesses will probably produce a match. Theoretically, the card can be hacked but this is not realistic as the card accesses would take a third party about 109 years (assuming 50 ms per card access).

In an embodiment, a communication system allowing for high degree of privacy may be provided. ISO 14443-3 defines an option to return a random 4 Byte UID in response to an SEL command (the random value may be 3 Bytes long). The PICC may then return a single size UID of the form 0x08 XX YY ZZ. However, a fixed Mifare UID is frequently used for per-card data key diversification. In view of this, a mechanism to recover a fixed logical UID is required. For this purpose, a proprietary command may be defined for this function. In an embodiment, an invertible transformation to map between a "logical UID" and a "physical UID" may be used. Block cipher may provide such a transformation and may restrict the access to the logical UID to the system owner. With such an approach, a high degree of privacy may be achieved.

As will be described in the following referring to FIG. 3, it is possible to perform an invertible transformation over non-standard block size using a standard block cipher and a Feistel structure (at top level).

Figure 3:
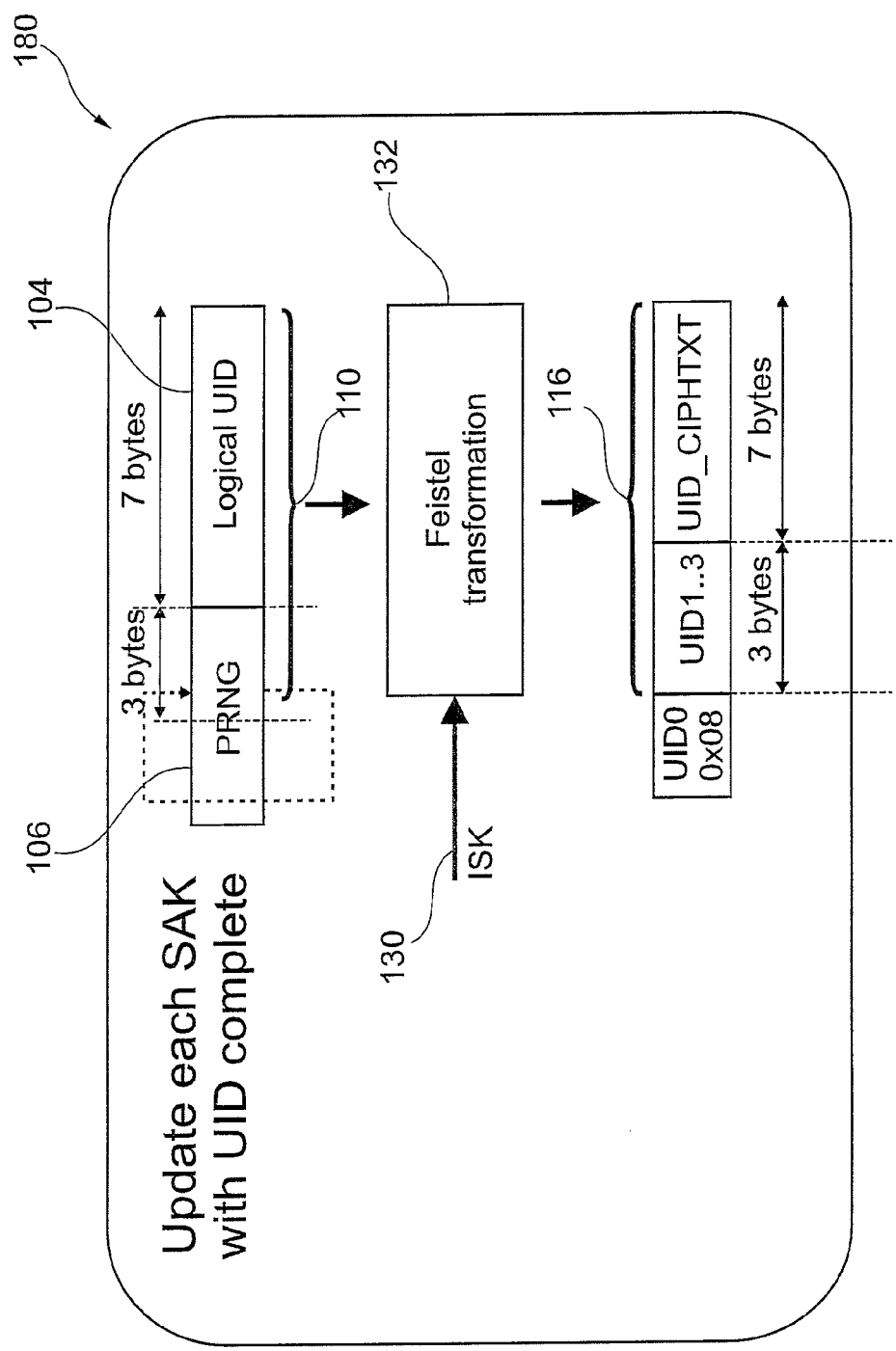
FIG. 3 shows a smart card with a Feistel transformation as encryption algorithm according to an exemplary embodiment of the invention.

In the embodiment of the PICC 180 shown in FIG. 3, the block cipher encryption block (compare reference numeral 112 in FIG. 1) is substituted by a Feistel transformation block 132.

Figure 4:
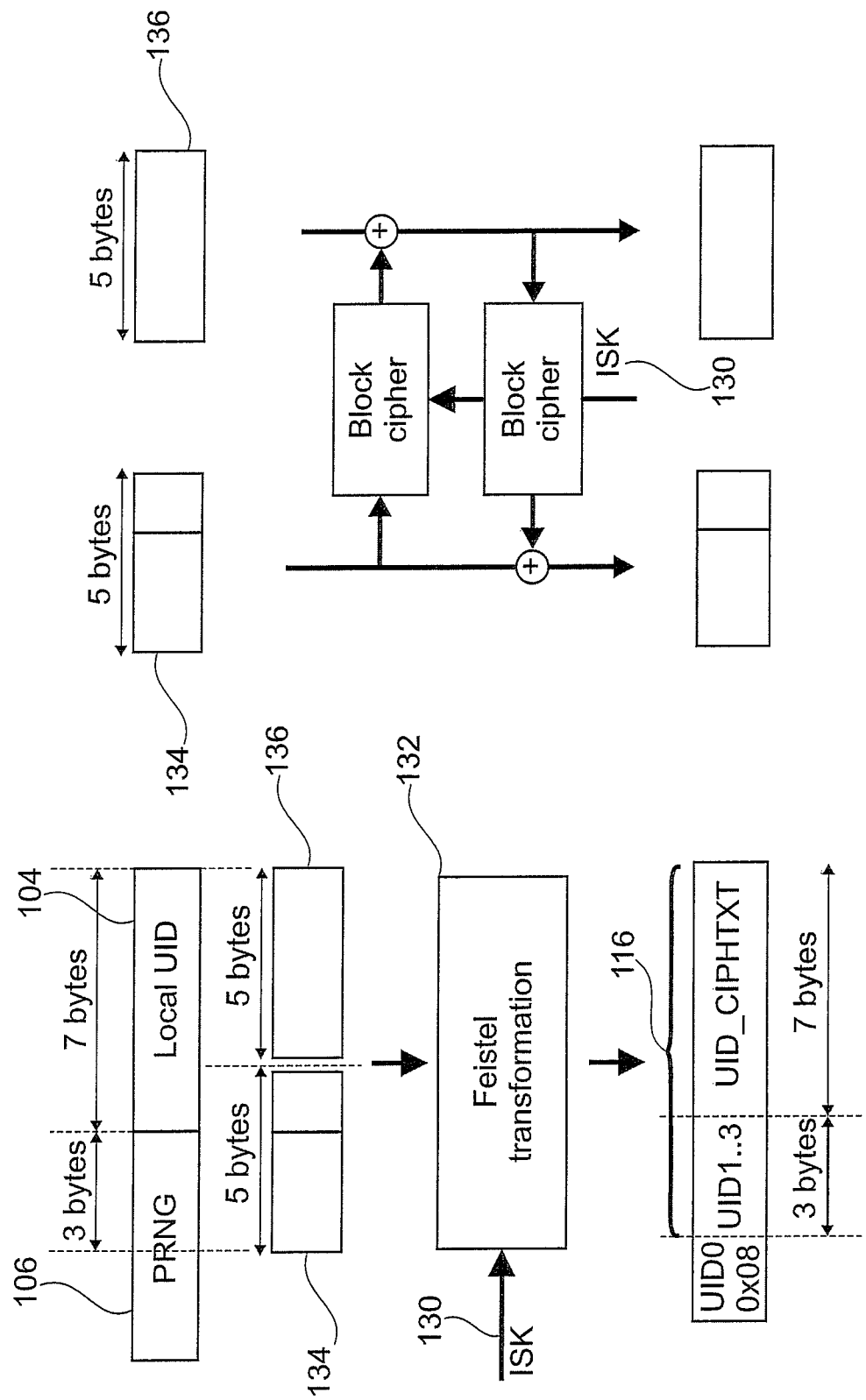
FIG. 4 shows the Feistel transformation of FIG. 3 in detail.

FIG. 4 shows further details regarding the Feistel transformation. As can be taken from FIG. 4, the pseudo random number 106 and the logical UID 104 may be combined and may be split into two blocks of 5 Bytes each, denoted with reference numeral 134 and 136 omitting a beginning portion of the pseudo random number 106. These two blocks 134, 136 may then be made subject of the Feistel transformation 132 using the ISK key 130.

Figure 5:
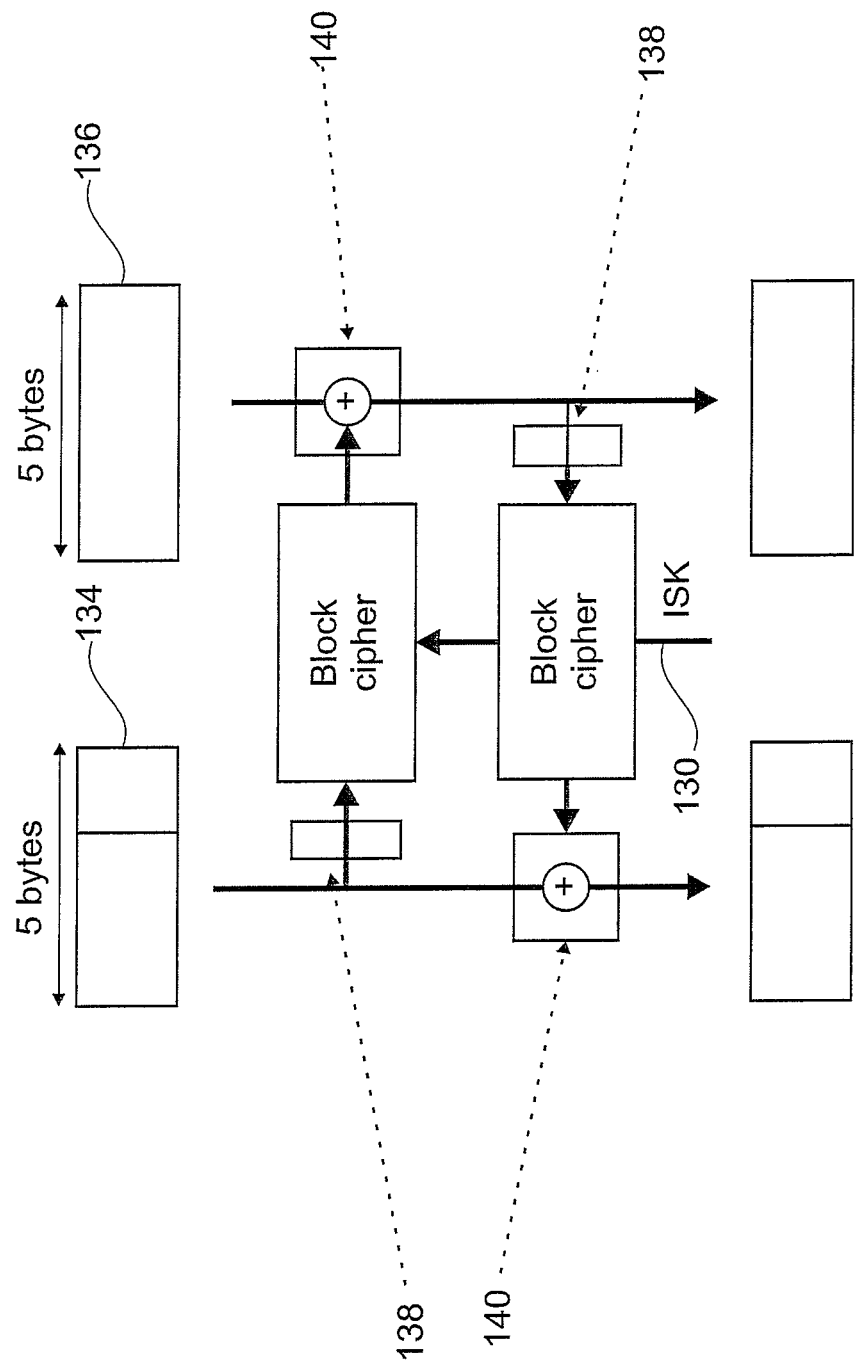
FIG. 5 shows possible implementation-specific functions according to an exemplary embodiment of the invention.

FIG. 5 illustrates possible implementation specific functions. Assuming a standard block cipher function/block size (for instance DES/3DES), possible sites for implementation specific functions are a bus expansion logic (compare reference numeral 138) and/or a round combining function (compare reference numeral 140).

Many different designs of the pseudo random number generator and the correspondingly generated random numbers are possible, regarding length, one way function, etc. As an alternative to a pseudo random number, it is also possible to generate a true random number. Such a true random number may produce enough bits in time for the first anti-collision loop. For instance in a scenario in which a Feistel transformation cannot be performed quickly enough, it is possible to prepare responses during the previous card transaction. In other words, processing for a session N+1 may be performed during an N-th session.

Regarding the Feistel design, many alternatives are possible. A balanced embodiment is possible, an unbalanced embodiment is possible as well. Regarding mapping of inputs, it may be presumed that PRNG bits can be on the left (as shown for instance in FIG. 1 to FIG. 4), dispersed by both rounds instead of only one, etc.

With the described embodiments, it is possible to maintain privacy and to avoid tracking by any unauthorized third party, for instance during a card recognition phase. The operator can always track cards. The operator may own application data space, can insert arbitrary identifiers, history, etc. This privacy measure can only protect against tracking by third parties who can access [random UID∥UID_CIPHTXT] without further controls. The operator cannot predict a random UID sequence, but can tabulate a card's $2^{24}$ possible [random UID∥UID_CIPHTXT] values. Supplying this table ($7\times2^{24}$ Bytes=112 Megabyte) may facilitate tracking by a third party. A third party can confirm identity of a specific card from a single access. This may presume that an operator does not want to expose an ISK.

To mitigate this thread, it may be advantageous to include more diversity in UID_CIPHTXT. For instance, more PRNG bits may be provided in plaintext space, and it may be possible to return a longer UID_CIPHTXT bit string. An aim is to make this computationally and/or operationally infeasible by properly adjusting length of ID and/or random number.

Figure 6:
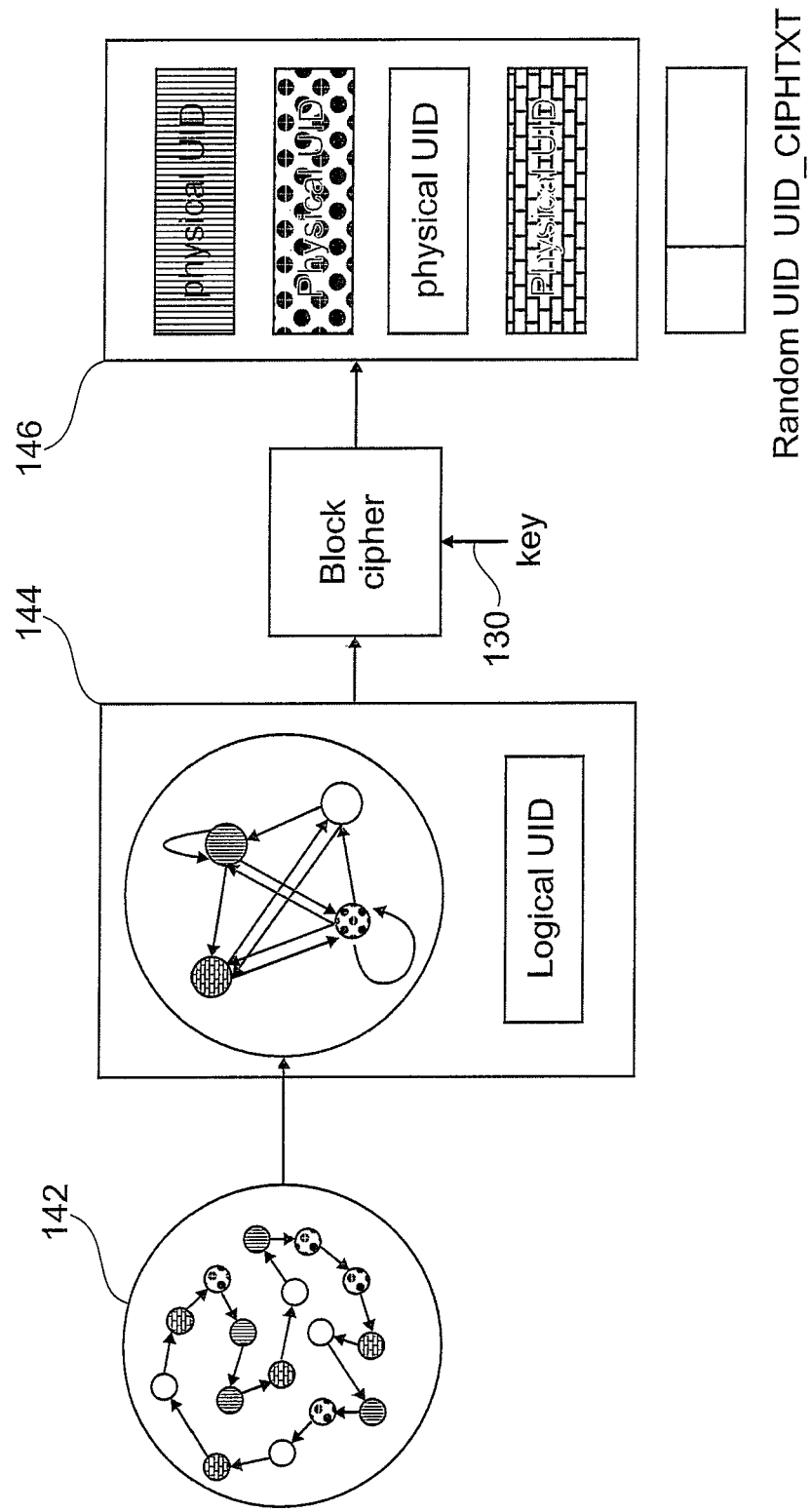
FIG. 6 shows an overview over a system according to an exemplary embodiment of the invention.

FIG. 6 gives an overview over the architecture of a communication system according to an exemplary embodiment of the invention.

A PRNG space is denoted with reference numeral 142. A plaintext space logical UID is denoted with reference numeral 144. Furthermore, a cipher text space of physical UID is denoted with reference numeral 146.

FIG. 7 shows a table summarizing privacy options according to exemplary embodiments of the invention.

In the following, referring to FIG. 8, a communication system 150 according to an exemplary embodiment of the invention will be explained.

The communication system 150 may be similar to that shown in FIG. 1 and FIG. 2 and comprises the reader 160 and the transponder 180. The reader 160 comprises a processor 164 (such as a microprocessor or a central processing unit) which is communicatively coupled with an emitter antenna 166 and a receiver antenna 162. The emitter antenna 166 is capable of transmitting a communication message 168 to the transponder 180. The receiver antenna 162 is capable of receiving a communication message 170 from the transponder 180. Although the transmitter antenna 166 and the receiver antenna 162 are illustrated as two different antennas in FIG. 8, alternative embodiments may also use a single common shared transceiver antenna.

The antennas 166, 162 are electrically coupled with the processor 164 so that data may be sent from the processor 164 to the transmission antenna 166 for transmission as a communication message 168, and a communication message 170 received by the receiver antenna 162 may also be analyzed and processed by the processor 164.

A storage unit 172 such as a semiconductor memory is coupled with the processor 164 so as to store data accessible by the processor 164. Furthermore, an input/output unit 174 is shown which allows a user to operate the reader device 160. The input/output unit 174 may comprise input elements such as buttons, a keypad, a joystick or the like. Via such input elements, a user may input commands to the reader device 160. Furthermore, the input/output unit 174 may comprise a display unit such as a liquid crystal display allowing to display results of the reading procedure of the reader device 160 visible for a user.

Figure 8:
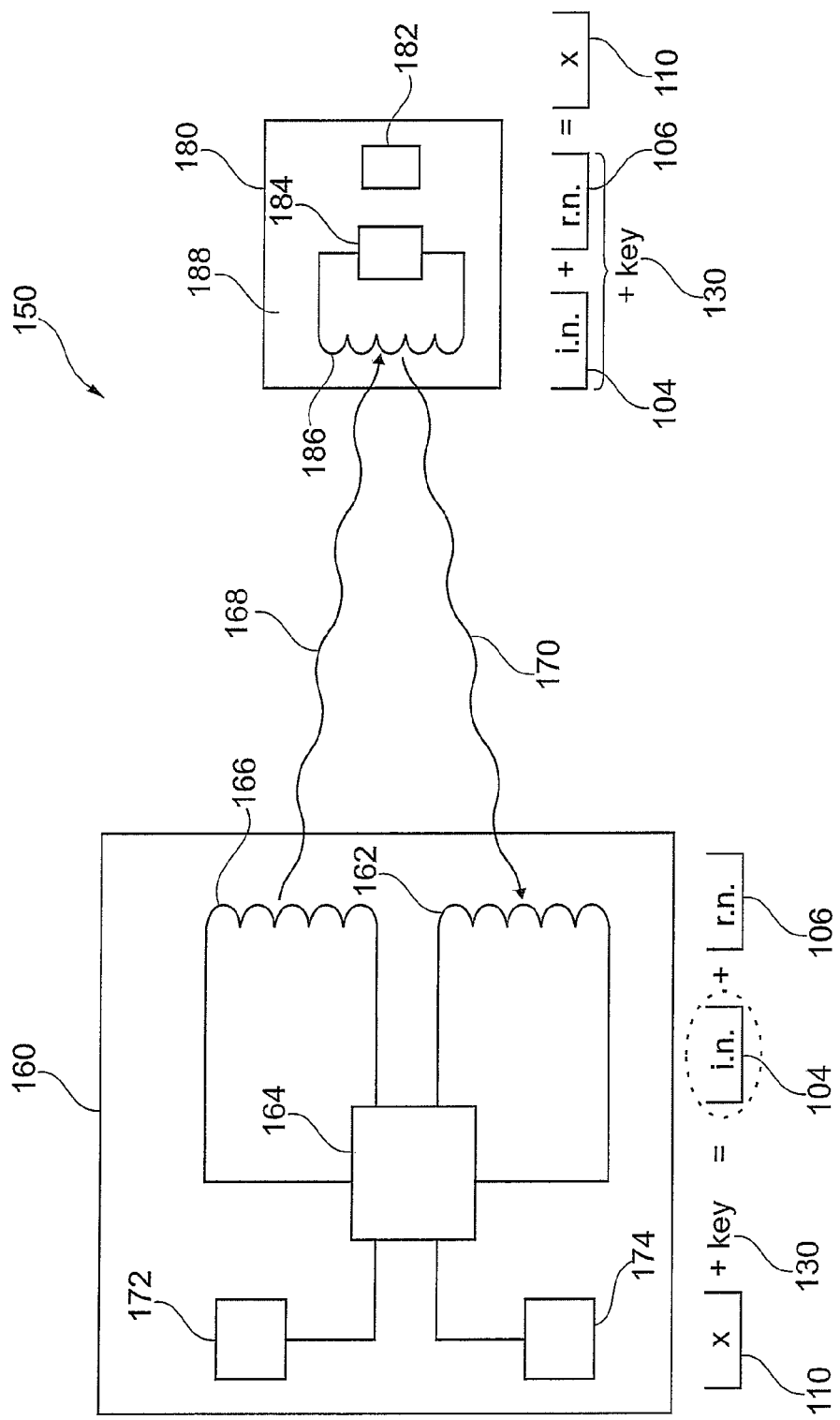
FIG. 8 shows a communication system according to an exemplary embodiment of the invention.

As can further be taken from FIG. 8, the transponder 180 comprises a transmission and receiver antenna 186, a processor 184 such as a microprocessor and a memory 182. In an embodiment, the memory 182 and the processor 184 may be monolithically integrated in an integrated circuit (IC) which can be connected to the antenna 186 and attached to a support 188 such as a piece of fabric.

The communication messages 168, 170 can be exchanged in a wireless manner between the entities 160, 180. Alternatively, a wired communication is possible as well.

The storage unit 182 of the transponder 180 has stored the fixed identification number 104. This identification number 104 is unchangeable and remains constant for each and every communication between the transponder 180 and any reader device such as a reader device 160. Thus, the corresponding portion of the storage unit 182 may never be overwritten. The processor 184 is adapted to expand said identification number 104 with a random number. This random number is denoted with reference numeral 106 in FIG. 8. The random number 106 may be generated by the processor 184 and may then be denoted as a pseudo random number. However, it is also possible that a true random number generator is included in the transponder 180 or that a number of true random numbers are stored in the memory 182. In the latter embodiment, for each communication, one of the stored random numbers may be used for expansion of the identification number 104.

After having expanded the identification number 104 with the random number 106, the processor 184 may generate an encrypted number 110 using a fixed encryption key 130. The encryption key 130 may be stored in the memory 182 as well and may also be known by the reader device 160.

The antenna 186 may serve as a transmission unit for sending the encrypted number 110 (for instance as communication message 168) to the reader 160 on request (for instance via communication message 170) of the reader 160. In other words, the reader 160, for instance during an anti-collision procedure, may send an identification request 168 to the transponder 180. Upon receipt of this request message 168, the transponder 180 may send back the encrypted number 110 included in a wireless communication message 180 for receipt by the receiver antenna 162 of the reader 160.

The receiver antenna 162 will receive the encrypted number 110 included in the communication message 170. The processor 164 may then serve as a decryption unit for decrypting the received number 110 with the key 130, which was also used by the transponder 180. The processor 164 may further act as an extraction unit for extracting the fixed identification number 104 associated with the transponder 180. Thus, the reader 160 may also know the way of combining the identification number 104 with the random number 106 by the transponder 180, namely in the present embodiment that the number to be encrypted starts with the identification number 104 and is followed by the random number 106. With this information, the reader 160 may derive or retrieve the identification number 104 from the communication message 170.

One skilled in the art should note that the transponder, the reader and the method according to embodiments of the invention are not limited to contactless data transmission, but in principle also apply to wired communication.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A transponder, comprising:
a storage unit that is configured to store a fixed identification number;
a processing unit that is configured to expand said fixed identification number with a random number, and to encrypt said expanded number with a key, wherein the expanded number has a length equal to a sum of a length of the fixed identification number and a length of the random number, and the random number for a succeeding communication session is calculated during a preceding communication session; and a transmission unit that is configured to send the encrypted number to a reader on request of the reader and send only a part of the encrypted number to the reader during an anticollision procedure.

2. The transponder according to claim 1, wherein the processing unit is configured to expand said identification number with the random number and to encrypt said expanded number with the key during a first session of communicating with the reader for use of the encrypted number during a second session of communicating with the reader, said second session succeeding the first session.

3. The transponder according to claim 1, wherein the random number is a pseudo random number.

4. The transponder according to claim 1, wherein the fixed identification number is unchangeable.

5. The transponder according to claim 1, wherein the key is a fixed key.

6. The transponder according to claim 1, wherein the fixed identification number has a length of 5 Bytes and the random number has a length of 3 Bytes.

7. The transponder according to claim 1, adapted to operate in accordance with ISO 14443.

8. A reader, comprising:
a receiving unit that is configured to receive on request an encrypted number from a transponder, wherein the receiving unit is adapted to receive only part of the encrypted number from the transponder during an anticollision procedure; and
a decryption unit that is configured to decrypt said received number with a key, which was also used by the transponder, and to extract a fixed identification number associated with the transponder, wherein the encrypted number has a length equal to a sum of a length of the fixed identification number and a length of a random number, and the random number for a succeeding communication session is calculated during a preceding communication session.

9. The reader according to claim 8, further comprising:
a request unit that is configured to request the transponder to transmit the entire encrypted number in a single communication message.

10. The reader according to claim 8, further comprising:
a request unit that is configured to request the transponder to transmit the encrypted number in two separate communication messages in conformity with ISO 14443.

11. The reader according to claim 8, that is configured to operate in accordance with ISO 14443-3.

12. A communication system, the communication system comprising:
the transponder according to claim 1; and
a reader communicatively coupled with the transponder.

13. A method of transmitting a fixed identification number from a transponder to a reader, the method comprising:
expanding, in the transponder, said fixed identification number with a random number, wherein the expanded number has a length equal to a sum of a length of the fixed identification number and a length of the random number and the random number for a succeeding communication session is calculated during a preceding communication session;
encrypting, in the transponder, said expanded number with a key; and
sending the encrypted number, from the transponder to the reader on request of the reader, wherein only part of the encrypted number is sent from the transponder to the reader during an anticollision procedure.

14. A method of receiving a fixed identification number by a reader from a transponder, the method comprising:
receiving, in the reader from the transponder, an encrypted number on request;
decrypting, in the reader, said encrypted number with a key, which was also used by the transponder, and
extracting, in the reader, said fixed identification number associated with said transponder, wherein only part of the encrypted number is received from the transponder during an anticollision procedure, wherein the encrypted number has a length equal to a sum of a length of the fixed identification number and a length of a random number and the random number for a succeeding communication session is calculated during a preceding communication session.

15. A non-transitory computer-readable medium, in which a computer program is stored, which computer program, when executed by a processor causes the processor to carry out instructions comprising:
instructions for expanding said fixed identification number with a random number;
instructions for encrypting said expanded number with a key; and
instructions for sending the encrypted number to a reader on request of the reader, wherein only part of the encrypted number is sent to the reader during an anticollision procedure, wherein the encrypted number has a length equal to a sum of a length of the fixed identification number and a length of the random number and the random number for a succeeding communication session is calculated during a preceding communication session.

* * * * *